US012709485B2

(12) United States Patent
Riou et al.

(10) Patent No.: US 12,709,485 B2
(45) Date of Patent: Aug. 18, 2026

(54) DEVICE FOR TRANSFERRING A SOLID MATERIAL WITH ENDLESS SCREW AND REMOVABLE ANTI-ROTATION DEVICE

(71) Applicant: ROUAGES, Estillac (FR)

(72) Inventors: Christophe Riou, Trelissac (FR); Pierre Jannot, Fieux (FR)

(73) Assignee: ROUAGES, Estillac (FR)

( * ) Notice: Subject to any disclaimer, the term of this patent is extended or adjusted under 35 U.S.C. 154(b) by 68 days.

(21) Appl. No.: 18/716,581

(22) PCT Filed: Nov. 17, 2022

(86) PCT No.: PCT/FR2022/052112
§ 371 (c)(1),
(2) Date: Jun. 5, 2024

(87) PCT Pub. No.: WO2023/105134
PCT Pub. Date: Jun. 15, 2023

(65) Prior Publication Data

US 2025/0108976 A1 Apr. 3, 2025

(30) Foreign Application Priority Data

Dec. 6, 2021 (FR) .................................... 21/12985

(51) Int. Cl.
*B65G 33/14* (2006.01)
*B65G 33/24* (2006.01)

(52) U.S. Cl.
CPC ............. *B65G 33/14* (2013.01); *B65G 33/24* (2013.01); *B65G 2812/0544* (2013.01); *B65G 2812/0561* (2013.01)

(58) Field of Classification Search
CPC B65G 33/14; B65G 33/24; B65G 2812/0544; B65G 2812/055; B65G 2812/0561; B65G 2812/0583
(Continued)

(56) References Cited

U.S. PATENT DOCUMENTS 4,454,943 A * 6/1984 Moller .................. B65G 33/24 198/671
5,611,268 A * 3/1997 Hamilton .............. B30B 11/246 100/147
(Continued)

FOREIGN PATENT DOCUMENTS

JP H09226919 A 9/1997

OTHER PUBLICATIONS

International Search Report for corresponding application PCT/FR2022/052112 filed Nov. 17, 2022; Mail date Mar. 16, 2023.

*Primary Examiner* — Gene O Crawford
*Assistant Examiner* — Keith R Campbell
(74) *Attorney, Agent, or Firm* — CANTOR COLBURN LLP

(57) ABSTRACT

The invention relates to a transfer device (1) for transferring a solid material in powder, particle or granule form, the transfer device (1) comprising a transfer tube (30); at least one worm screw (50) arranged inside the transfer tube (30); at least one anti-rotation member (70) removably positioned in the transfer tube (30) at an intermediate location radially positioned between the transfer tube (30) and the at least one worm screw (50), the at least one anti-rotation member (70) comprising an inner surface provided with blocking protrusions (71); and an attachment system (90) configured to provide a reversible fitted connection between the at least one anti-rotation member (70) and the transfer tube (30).

14 Claims, 2 Drawing Sheets

(58) Field of Classification Search
USPC .................................................. 198/658, 670
See application file for complete search history.

(56) References Cited

U.S. PATENT DOCUMENTS

| | | | | |
|---|---|---|---|---|
| 6,247,662 | B1 * | 6/2001 | Hamilton | B30B 9/3082 241/260.1 |
| 7,357,074 | B2 * | 4/2008 | Kraft | B30B 9/121 100/145 |
| 8,181,570 | B2 * | 5/2012 | Svedberg | D21B 1/22 100/337 |
| 10,501,266 | B2 * | 12/2019 | Maeda | B65G 33/24 |
| 2006/0196370 | A1 | 9/2006 | Kraft et al. | |
| 2008/0067036 | A1 * | 3/2008 | Voorthuysen | B65G 33/14 198/677 |

* cited by examiner

DEVICE FOR TRANSFERRING A SOLID MATERIAL WITH ENDLESS SCREW AND REMOVABLE ANTI-ROTATION DEVICE

TECHNICAL FIELD

The present disclosure concerns a device for transferring a solid material, which is configured to transfer along a transfer axis a solid material between an inlet and an outlet of a transfer tube. The solid material is provided in powder, granular or particulate form.

BACKGROUND

In different technical fields, it is necessary to convey a mass of solid material between two points through a conveying device. For example, in the building sector, such a transfer device is useful when it is desired to discharge debris.

In other technical fields and in particular in industrial production, it is necessary to convey objects or substances between two points through a transfer device. In the case where the solid material to be conveyed is powdery, granular or particulate, it is known from the state of the art to use a screw conveyor to transport said solid material. For example, such a screw conveyor may comprise an endless screw disposed inside the conveyor which may have the shape of a tube to transfer the material. Said endless screw may have one or several thread(s) and a variable screw pitch which makes it possible to adjust the quantity of material to be transferred. In addition to an endless screw, the conveyors are generally equipped with one or several rotational blocking system(s), disposed on their walls, and which guide the displacement of the solid material inside the conveyor. For example, these blocking systems may comprise ribs formed by rods which are welded to the wall of the conveyor.

Although these ribs are satisfactory in that they make it possible to transfer the solid material longitudinally inside the conveyor, they may be damaged by torsion, in particular when the torque imposed by the endless screw is too great. In this case, to repair the conveying device, the entire conveyor must be changed.

Moreover, in the case where the solid material to be transferred is a biological material (such as a drug, a food, a cosmetic product, etc.), it is essential to guarantee the cleanliness of the transfer device. Thus, it is common to have to clean the conveyor to extract any material that may have remained blocked in the tube. When the transfer device has internal ribs, it is very difficult or even impossible to clean it satisfactorily. In fact, the ribs favor the retention of solid material in the tube, which has the consequence of causing a rapid fouling of the device, which in addition cannot be cleaned correctly.

BRIEF SUMMARY

The aim of the present disclosure is to propose a solution which responds to all or part of the aforementioned problems.

In particular, the aim of the disclosure is to propose a solution which meets at least one of the following objectives:

- transferring solid material between an inlet and an outlet of a transfer tube;
- ensuring a rotational blocking of said solid material during its transfer;
- allowing a dismantling and an easy cleaning of the transfer device;
- presenting a device for transferring a solid material having simple design and manufacture;
- proposing a device for transferring a solid material that is reliable, economical and robust.

This aim may be achieved by providing a transfer device suitable for transferring a solid material in powder, particulate or granular form, the transfer device comprising:

- a transfer tube extending along a transfer axis and comprising two opposite ends delimiting respectively an inlet allowing the solid material to enter the transfer tube and an outlet allowing the solid material to exit from the tube transfer;
- at least one endless screw with at least one thread disposed inside the transfer tube, rotatably mounted with respect to the transfer tube along a rotational axis coinciding with, or parallel to, the transfer axis and configured to ensure, when said at least one endless screw is driven in a rotational movement about the rotational axis, a displacement of the solid material relative to the transfer tube oriented from the inlet to the outlet of the transfer tube;
- at least one motion actuator ensuring a rotational movement of said at least one endless screw relative to the transfer tube;
- at least one anti-rotation member removably positioned in the transfer tube at an intermediate location radially positioned between an internal face of the transfer tube and the top of said thread of said at least one endless screw, said at least one anti-rotation member comprising an internal surface facing said at least one endless screw, the internal surface being provided with blocking asperities configured to oppose a rotational movement of the solid material relative to the transfer tube about the rotational axis and thus to convert, for the solid material present in the transfer tube, the rotational movement of the endless screw into said displacement of the solid material from the inlet to the outlet of the transfer tube where said displacement essentially comprises an axial component along the transfer axis;
- a fastening system configured to ensure a reversible embedding connection between the at least one anti-rotation member and the transfer tube.

The arrangements previously described make it possible to propose a transfer device capable of transferring a solid material between an inlet and an outlet of the transfer tube, in particular thanks to the presence of the anti-rotation member. Advantageously, proposing a removable anti-rotation member facilitates the maintenance and the cleaning of the transfer device. This is particularly advantageous when the solid material to be transferred is a putrescible or sterile material, for example a solid material used in the pharmaceutical, cosmetics, agri-food industry, in biotechnology or in a related field.

The transfer device may also present one or several of the following characteristics, taken alone or in combination.

According to one embodiment, the blocking asperities are provided in the form of hollows, cavities, and/or bumps or protrusions.

According to one embodiment, the solid material is an agri-food, or biological, or cosmetic, or pharmaceutical product.

According to one embodiment, the transfer tube comprises a lateral wall.

According to one embodiment, the lateral wall of the transfer tube is sealed.

In this way it is possible to contain both fluids and solid material in powder, particulate or granular form inside the transfer tube between the inlet and the outlet.

In this way, the transfer tube is suitable for transferring a wider variety of material. Furthermore, the transfer device may be suitable for transferring sterile material or material sensitive to contamination.

According to one embodiment, the at least one anti-rotation member is a linear guide configured to guide the solid material along the transfer axis inside the transfer tube.

According to one embodiment, the transfer tube internally defines a transfer volume in which the solid material is completely contained during its transfer from the inlet to the outlet of the transfer tube.

According to one embodiment, the at least one anti-rotation member and the endless screw are contained in the transfer volume.

According to one embodiment, the motion actuator is a manual or motorized actuator.

According to one embodiment, the motion actuator is a device making it possible to rotate the endless screw about the rotational axis.

According to one embodiment, the motion actuator comprises a drive device, for example a drive motor configured to drive the endless screw in rotation about the rotational axis. For example, the drive device may be secured to the endless screw at a drive end of said endless screw.

Advantageously, the rotational speed at which the drive device drives the endless screw makes it possible to control the transfer speed of the solid material in the transfer device.

According to one embodiment, the transfer device comprises a number of endless screws greater than or equal to 2.

According to one embodiment, the rotational axis is distinct from the transfer axis. In other words, the endless screw may be offset relative to the transfer tube.

According to one embodiment, the placement and the removal of the at least one anti-rotation member towards and from said intermediate location is carried out by one of the ends of the transfer tube.

According to one embodiment, the at least one anti-rotation member is provided in the form of all or part of a cylindrical surface.

By "cylindrical surface", we mean a surface generated by a straight line, called generatrix, which moves in a given direction based on a closed curved line called directrix. In the present case, the directrix corresponds to the profile of the cutting section of the at least one anti-rotation member, and may present crenellations corresponding to the presence or the absence of blocking asperities which may preferentially take the shape of grooves.

According to one embodiment, the generatrix is oriented so as to coincide with, or be parallel to, the transfer axis of the transfer tube.

According to one embodiment, the anti-rotation member generally presents a tubular shape.

In other words, the anti-rotation member is included in a volume presenting a tubular shape.

According to one embodiment, the anti-rotation member presents the shape of a half-tube.

According to one embodiment, the anti-rotation member is included in a cylindrical volume formed by a generatrix which coincides, or which is parallel to the transfer axis.

According to one embodiment, a length of the transfer tube counted along the transfer axis is equal, to within 10%, to a length of the at least one anti-rotation member counted along the transfer axis.

According to one embodiment, the transfer tube and/or the anti-rotation member have a ratio of a length counted along the transfer axis divided by a diameter counted radially relative to the transfer axis comprised between 2.0 and 12.0.

According to one embodiment, the blocking asperities comprise at least one recessed groove in the internal surface in the at least one anti-rotation member.

According to one embodiment, said at least one groove presents a component along the transfer axis.

According to one embodiment, said at least one groove is curved, for example twisted, along the transfer axis.

According to one embodiment, said at least one groove is rectilinear. More particularly, said at least one groove may have an elongated rectilinear rectangular shape.

According to one embodiment, said at least one groove is oblong in shape.

According to one embodiment, the at least one anti-rotation member comprises a number of grooves comprised between 6 and 18, and more particularly equal to 12.

Advantageously, the shape and the number of grooves makes it possible to set the transfer speed of the solid material along the transfer axis. This is particularly useful if one wishes to control the passage time of the solid material in the transfer device.

According to one embodiment, the grooves are provided through a thickness of the at least one anti-rotation member. In other words, the grooves form openings in the anti-rotation member.

According to one embodiment, each groove is radially through the thickness of the anti-rotation member so as to emerge both on the side of the transfer tube and on the side of the endless screw.

According to one embodiment, the blocking asperities comprise at least one rib protruding from the internal surface of the at least one anti-rotation member.

For example, said at least one rib may comprise a rod welded to the rest of the anti-rotation member at the internal surface.

According to one embodiment, the at least one rib presents at least one component along the transfer axis.

According to one embodiment, said at least one rib is curved along the transfer axis.

According to one embodiment, the blocking asperities protruding from the internal surface towards the inside of the at least one anti-rotation member.

According to one embodiment, the blocking asperities are arranged only axially on the internal surface of the at least one anti-rotation member along the transfer axis.

According to one embodiment, the blocking asperities are angularly distributed over the internal surface of the at least one anti-rotation member about the transfer axis, in particular in a regular manner following a constant angular pitch.

In this way, the design and the manufacture of the anti-rotation member are simplified.

According to one embodiment in which the blocking asperities comprise a plurality of grooves provided regularly in the anti-rotation member, each groove is separated from another neighboring groove by a channel. In this case, provision may be made for a width of a channel to be strictly less than a groove width, said widths being counted perpendicular to the radial direction about the transfer axis. For example, a width of a groove may be comprised between 1 cm and 5 cm, and a width of a channel may be comprised between 1 cm and 3 cm.

The arrangements previously described make it possible to propose the widest possible grooves to facilitate the angular blocking of the solid material, and therefore facilitate its transfer along the transfer tube, while proposing sufficiently wide channels so that they don't twist under the effect of the torque generated by the forces applied to the solid material by the endless screw.

According to one embodiment, at least one element chosen from among the transfer tube and the anti-rotation member is an integral piece.

In this way it is possible to improve the mechanical resistance of this element. In addition, this makes it easier to place and remove it in a single operation.

According to one embodiment, at least one element chosen from among the group consisting of the transfer tube and of the at least one anti-rotation member is formed from a material comprising a stainless steel.

According to one embodiment, the at least one anti-rotation member is made entirely of stainless steel.

According to one embodiment, the blocking asperities are cut in a lateral wall made of stainless steel of the at least one anti-rotation member, so as to form openings in said anti-rotation member. For example, the blocking asperities are formed by laser cutting of the anti-rotation device.

According to one embodiment, the at least one anti-rotation member comprises a plastic material, or any other material having a sufficient rigidity to support a torque linked to the rotation of the endless screw.

According to one embodiment, the transfer tube comprises a lateral wall and an intake opening provided through said lateral wall, the intake opening being disposed at the inlet and configured to allow the solid material to be introduced into the transfer tube from the outside of the transfer tube, and wherein the transfer tube comprises a discharge opening provided through the lateral wall and disposed at the outlet, said discharge opening being configured to allow the solid material having been transferred along the transfer tube to pass from the inside to the outside of the transfer tube.

According to one embodiment, the at least one anti-rotation member comprises a passage opening disposed in line with the admission opening of the transfer tube and/or a passage opening disposed in line with the discharge opening of the transfer tube, each passage opening being configured to allow the passage of the solid material alternately between the exterior and the interior of the anti-rotation member.

In this way, the solid material is introduced directly into the interior of the volume delimited by the anti-rotation member (and in which the endless screw is present) from the outside of the transfer tube.

According to one embodiment, an external diameter of the at least one anti-rotation member is slightly smaller than an internal diameter of the transfer tube. In this way the size of the anti-rotation member is adjusted to or less than the transfer tube. It is therefore possible to transfer a greater quantity of solid material between the inlet and the outlet, while allowing an optimized axial movement. By "slightly less", we mean that the difference between the external diameter of the at least one anti-rotation member and the internal diameter of the transfer tube is comprised between 1/50 and 1/200 of a diameter of the transfer tube counted radially relative to the transfer axis. In this way, it is possible to easily extract the anti-rotation member from the transfer tube.

Furthermore, by minimizing the distance separating the transfer tube and the anti-rotation member, it is possible to limit or eliminate any risk of introduction of solid material between the anti-rotation member and the transfer tube.

According to one embodiment, the at least one anti-rotation member comprises at least one first anti-rotation member and one second anti-rotation member ranging in the transfer tube along the transfer axis.

It is therefore well understood that the transfer device may comprise a plurality of anti-rotation members.

According to one embodiment, the transfer device comprises a plurality of anti-rotation members, each anti-rotation member being disposed axially in the extension of another adjacent anti-rotation member.

In other words, the transfer device may comprise a plurality of anti-rotation members mounted in the extension of each other along the transfer axis. For example, the second anti-rotation member axially extends the first anti-rotation member from an axial end of the first anti-rotation member.

According to one embodiment, the first anti-rotation member is provided, at an axial end of the first anti-rotation member, with a first blocking element, and in which the second anti-rotation member is provided, at an axial end of the second anti-rotation member, with a second blocking element, said first and second blocking elements being configured to cooperate with each other, so as to block a relative rotational movement between the first anti-rotation member and the second anti-rotation member about the rotational axis of the endless screw.

According to one embodiment, the first blocking element and the second blocking element are configured to cooperate with each other by snap-fitting.

According to one embodiment, the first blocking element comprises a female part and the second blocking element comprises a male part, the female part being configured to cooperate with the male part.

According to one embodiment, said first and second blocking elements form an assembly configured to block, in addition, a relative movement of axial translation along the transfer axis between the first anti-rotation member and the second anti-rotation member.

According to one embodiment, said first and second blocking elements form a dovetail assembly.

Thus, and advantageously, the dovetail assembly and the fastening system make it possible to fasten the assembly comprising the first and second anti-rotation members to the transfer tube.

For example, the fastening system ensures the removable fastening of the first anti-rotation member to the transfer tube without providing a direct connection between the transfer tube and the second anti-rotation member, and the second anti-rotation member is itself maintained in axial translation and in rotation about the rotational axis by the first anti-rotation member (itself secured to the transfer tube by the fastening system) through the first and second blocking elements cooperating with each other.

According to one embodiment, the fastening system comprises at least one bolt having a male threaded element and a female threaded element cooperating with each other by screwing, the female threaded element being secured to the transfer tube, the male threaded element being configured so that a top end of the male threaded element bears against an external surface of the at least one anti-rotation member, the anti-rotation member thus being fastened to the transfer tube by clamping between the transfer tube and the top end of the male threaded element when the male threaded element is screwed relative to the female threaded element.

According to one embodiment, the fastening system comprises a plurality of studs or screws distributed or not over the length of the transfer tube, so as to maintain the at least one anti-rotation member in a fastened manner on the transfer tube.

According to one embodiment, the female threaded element is provided in the body of the transfer tube.

In general, the fastening system is configured to fasten the at least one anti-rotation member to the transfer tube in a reversible manner.

BRIEF DESCRIPTION OF THE DRAWINGS

Other aspects, aims, advantages and characteristics of the disclosure will appear better on reading the following detailed description of preferred embodiments thereof, given by way of non-limiting example, and made with reference to the appended drawings on which.

DETAILED DESCRIPTION

On the figures and in the remainder of the description, the same references represent identical or similar elements. In addition, the different elements are not represented to scale so as to favor the clarity of the figures. Furthermore, the different embodiments and variants are not exclusive of each other and may be combined with each other.

As represented in FIGS. 1 to 4, the disclosure concerns a transfer device 1 suitable for transferring a solid material in powder, particulate or granular form. For example, the solid material may be an agri-food, or biological, or cosmetic, or pharmaceutical product.

Figure 1:
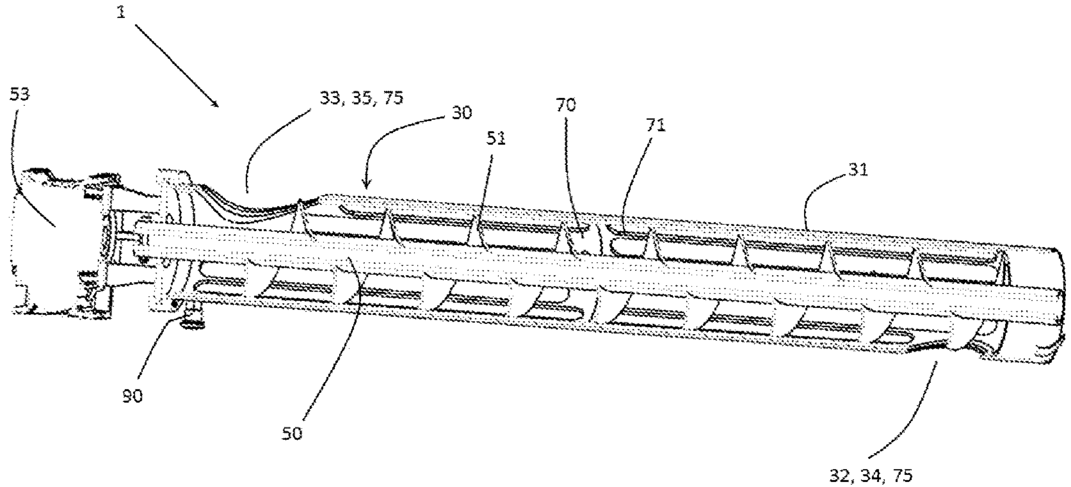
FIG. 1 is a schematic sectional view of the transfer device according to a particular embodiment of the disclosure.

With reference to FIG. 1, the transfer device 1 comprises a transfer tube 30 extending along a transfer axis and comprising two opposite ends respectively delimiting an inlet 32 allowing the solid material to enter the transfer tube 30 and an outlet 33 allowing the solid material to exit from the transfer tube 30. The transfer tube 30 may comprise a lateral wall 10 extending about the transfer axis. According to a particular embodiment, the lateral wall of the transfer tube 30 is sealed. In this way, the transfer tube 30 is capable of containing both fluids and solid material in powder, particulate or granular form between the inlet 32 and the outlet 33. In this way, the transfer tube 30 is suitable for transferring a greater variety of material. Furthermore, the transfer device 1 may be suitable for transferring sterile material or material sensitive to contamination.

The transfer device 1 further comprises at least one endless screw 50 with at least one thread 51 disposed inside the transfer tube 30, and at least one anti-rotation member 70 positioned removably in the transfer tube 30 at an intermediate location radially positioned between an internal face of the transfer tube 30 and the top of said thread 51 of said at least one endless screw 50.

According to the embodiment represented on the figures, the transfer tube 30 comprises a lateral wall 31 having a generally cylindrical shape, which internally defines a transfer volume in which the solid material is entirely contained during its transfer from the inlet 32 to the outlet 33 of the transfer tube 30. According to this embodiment, the at least one anti-rotation member 70 and the endless screw 50 are contained in the transfer volume. The lateral wall 31 may further comprise an intake opening 34 provided through said lateral wall 31, and possibly positioned close to a first end of the transfer tube. The intake opening 34 is for example disposed at the inlet 32 and configured to allow the solid material to be introduced into the transfer tube 30 from the outside of the transfer tube 30. The transfer tube 30 may also comprise a discharge opening 35 provided through the lateral wall 31 and disposed at the outlet 33. The discharge opening 35 may be configured to allow the solid material having been transferred along of the transfer tube 30 to pass from the inside to the outside of the transfer tube 30. In order to maximize the distance separating the intake opening 34 and the discharge opening 35, it may be provided that the discharge opening 35 is positioned at an opposite end of the transfer tube 30 relative to the intake opening 34.

As indicated above, the transfer device 1 comprises at least one endless screw 50. According to one embodiment not represented, the transfer device 1 may comprise a number of endless screws 50 greater than or equal to 2. However, FIGS. 1 to 4 present one embodiment in which the transfer device 1 comprises only one endless screw 50. The at least one endless screw 50 is rotatably mounted with respect to the transfer tube 30 following a rotational axis coinciding with, or parallel to, the transfer axis. The endless screw 50 is configured to ensure, when it is driven in a rotational movement about the rotational axis, a displacement of the solid material relative to the transfer tube 30 oriented from the inlet 32 to the outlet 33 of the transfer tube 30. According to one embodiment not represented, the rotational axis may be distinct from the transfer axis, so that the endless screw 50 is offset relative to the transfer tube 30. However, generally, the rotational axis of the endless screw 50 coincides with the transfer axis.

Figure 2:
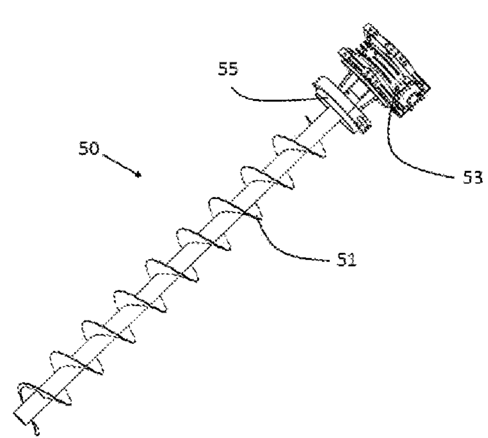
FIG. 2 is a schematic perspective view of the endless screw, and of the motion actuator according to a particular embodiment of the disclosure.

In order to put the at least one endless screw 50 in motion, the transfer device comprises at least one motion actuator 53 ensuring a rotational movement of said at least one endless screw 50 relative to the transfer tube 30. Generally, the motion actuator 53 may be any device allowing the endless screw 50 to rotate about the rotational axis. For example, the motion actuator 53 may be a manual or motorized actuator, such as a drive motor configured to drive in rotation the endless screw 50 about the rotational axis. With reference to FIGS. 1 and 2, the drive device may be secured to the endless screw 50 at a drive end 55 of said endless screw 50. The presence of the motion actuator 53 makes it possible to fasten the rotational speed at which the endless screw 50 is driven, which makes it possible to control the transfer speed of the solid material in the transfer device 1.

As indicated above, the transfer device 1 further comprises at least one anti-rotation member 70. The anti-rotation member 70 comprises in particular an internal surface facing the endless screw 50, which is provided with blocking asperities 71, preferably in the form of hollows, cavities, and/or bumps or projections, and configured to oppose a rotational movement of the solid material relative to the transfer tube 30 about the rotational axis. In this way, the blocking asperities 71 make it possible to convert, for the solid material present in the transfer tube 30, the rotational movement of the endless screw 50 into said displacement of the solid material from the inlet 32 to the outlet 33 of the transfer tube 30. This displacement then essentially comprises an axial component along the transfer axis. The at least one anti-rotation member 70 is therefore a linear guide configured to guide the solid material along the transfer axis inside the transfer tube 30. According to one embodiment, at least one element chosen from among the transfer tube 30 and the anti-rotation member 70 is an integral piece. In this way it is possible to improve the mechanical resistance of this element. In addition, this makes it easier to place and remove in a single operation.

According to the embodiment represented on the figures, the at least one anti-rotation member 70 is provided in the form of all or part of a cylindrical surface. By "cylindrical surface" we mean a surface generated by a straight line, called generatrix, which moves in a given direction based on a closed curved line called directrix. In the present case, the directrix corresponds to the profile of the cutting section of the at least one anti-rotation member 70, and may present crenellations corresponding to the presence or the absence of the blocking asperities 71 which may preferentially take the shape of grooves. The generatrix may in particular be oriented so as to coincide with, or be parallel to, the transfer axis of the transfer tube 30. In the case where the directrix is a circular curve provided with crenellations, the anti-rotation member 70 presents overall a tubular shape. In other words, the anti-rotation member 70 is included in a volume presenting a tubular shape. It may also be provided that the anti-rotation member 70 presents a general half-tube shape. More generally, it is possible that the anti-rotation member 70 is included in a cylindrical volume formed by a generatrix which coincides, or which is parallel to the transfer axis.

Advantageously, a length of the transfer tube 30 counted along the transfer axis is equal, to within 10%, to a length of the at least one anti-rotation member 70 counted along the transfer axis. Furthermore, the transfer tube 30 and/or the anti-rotation member 70 present a ratio of a length counted along the transfer axis divided by a diameter counted radially relative to the transfer axis comprised between 2.0 and 12.0.

According to one embodiment, an external diameter of the at least one anti-rotation member 70 is slightly less than an internal diameter of the transfer tube 30. In this way the dimension of the anti-rotation member 70 is adjusted or less than the transfer tube 30. It is therefore possible to transfer a larger quantity of solid material between the inlet 32 and the outlet 33, while allowing an optimized axial movement. By "slightly lower" we mean that the difference between the external diameter of the at least one anti-rotation member 70 and the internal diameter of the transfer tube 30 is comprised between 1/50 and 1/200 of a diameter of the transfer tube 30 counted radially relative to the transfer axis. In this way, it is possible to easily extract the anti-rotation member 70 from the transfer tube 30. Furthermore, by minimizing the distance separating the transfer tube 30 and the anti-rotation member 70, it is possible to limit, or eliminate any risk of introduction of solid material between the anti-rotation member 70 and the transfer tube 30.

According to one variant in which the transfer tube 30 comprises an intake opening 34, and a discharge opening 35, it may be provided that the at least one anti-rotation member 70 comprises a passage opening 75 disposed in line with the intake opening 34 of the transfer tube 30 and/or a passage opening 75 disposed in line with the discharge opening 35 of the transfer tube 30. In this case, each passage opening 75 may be configured to allow the passage of the solid material alternately between the exterior and the interior of the anti-rotation member 70. In this way, the solid material is introduced directly towards the interior of the volume delimited by the anti-rotation member 70 and in which the endless screw 50 is present from the outside of the transfer tube 30.

Advantageously, at least one element chosen from among the group consisting of the transfer tube 30 and of the at least one anti-rotation member 70 is formed in a material comprising a stainless steel. For example, the at least one anti-rotation member 70 may be made entirely of stainless steel. In this case, the blocking asperities 71 are cut out in the lateral wall 31 made of stainless steel of the at least one anti-rotation member 70, so as to form openings in said anti-rotation member 70. For example, the blocking asperities 71 may formed by laser cutting in the anti-rotation member 70. The arrangements previously described make it possible to propose a transfer device particularly suitable for agri-food, biological, cosmetic, or pharmaceutical applications. Alternatively or not, the at least one anti-rotation member 70 and/or the transfer tube 30 may comprise a plastic material, or any other material presenting a sufficient rigidity to support a torque linked to the rotation of the endless screw.

The blocking asperities 71 may take different shapes imagined by those skilled in the art, in order to oppose a rotational movement of the solid material relative to the transfer tube 30 about the rotational axis.

According to a first non-limiting variant, the blocking asperities 71 comprise at least one recessed groove in the internal surface in the at least one anti-rotation member 70. Generally, the at least one anti-rotation member 70 comprises a number of grooves comprised between 6 and 18, and more particularly equal to 12. Each groove may in particular present a component along the transfer axis. Said groove may for example be curved, or twisted, along the transfer axis. Alternatively or not, said at least one groove may be rectilinear, and may present an elongated rectilinear rectangular shape. According to the embodiment represented on FIGS. 2 to 4, said at least one groove is oblong in shape. Advantageously, the shape and the number of grooves makes it possible to set the transfer speed of the solid material along the transfer axis. This is particularly useful if one wishes to control the passage time of the solid material in the transfer device 1.

In order to facilitate the formation of the grooves, and in particular in the case of laser cutting, the grooves may be provided through a thickness of the at least one anti-rotation member 70. In other words, the grooves form openings in the anti-rotation member 70. Thus, each groove passes radially along the thickness of the anti-rotation member 70 so as to emerge both on the side of the transfer tube 30 and on the side of the endless screw 50.

According to a non-limiting embodiment in which the blocking asperities 71 comprise a plurality of grooves regularly provided in the anti-rotation member 70, each groove may be separated from another neighboring groove by a channel 73. In this case, it may be provided that a width of a channel 73 is strictly less than a groove width, said widths being counted perpendicular to the radial direction about the transfer axis. For example, a width of a groove may be comprised between 1 cm and 5 cm, and a width of a channel 73 may be comprised between 1 cm and 3 cm.

The arrangements previously described make it possible to propose the widest possible grooves to facilitate the angular blocking of the solid material, and therefore facilitate its transfer along the transfer tube 30, while proposing channels 73 that are sufficiently wide so that they don't twist under the effect of the torque generated by the forces applied to the solid material by the endless screw 50.

According to a second non-limiting variant, the blocking asperities 71 protrude from the internal surface towards the interior of the at least one anti-rotation member 70. The blocking asperities 71 may in particular comprise at least one rib protruding from the internal surface of the at least one anti-rotation member 70. For example, said at least one rib may comprise a rod welded to the rest of the anti-rotation member 70 at the internal surface. Said at least one rib may present at least one component along the transfer axis. According to one embodiment, said at least one rib is curved along the transfer axis.

Whatever the shape of the blocking asperities 71, it may be provided that they are arranged only axially on the internal surface of the at least one anti-rotation member 70 along the transfer axis. The blocking asperities 71 may also be angularly distributed on the internal surface of the at least one anti-rotation member 70 about the transfer axis, in particular regularly following a constant angular pitch. In this way, the design and the manufacture of the anti-rotation member 70 are simplified.

Figure 4:
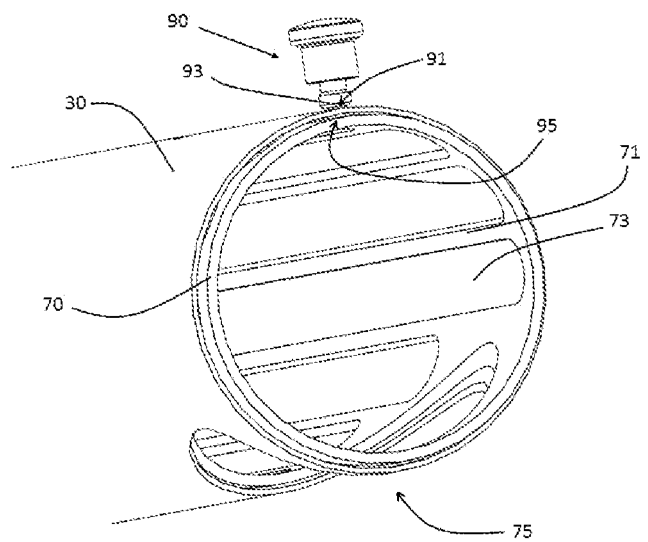
FIG. 4 is a schematic sectional view of the transfer device according to a particular embodiment of the disclosure presenting the fastening system.

Finally, with reference to FIG. 4, the transfer device 1 comprises a fastening system 90 configured to ensure a reversible embedding connection between the at least one anti-rotation member 70 and the transfer tube 30. In other words, the fastening system 90 is configured to fasten the at least one anti-rotation member 70 to the transfer tube 30 in a reversible manner. Generally, the placement and the removal of the at least one anti-rotation member 70 towards and from said intermediate location is carried out by one of the ends of the transfer tube 30.

FIG. 4 presents a non-limiting example of a fastening system making it possible to ensure a reversible embedding connection between the anti-rotation member 70 and the transfer tube 30. In this example, the fastening system 90 comprises at least one bolt having a male threaded element 93 and a female threaded element 91 cooperating with each other by screwing. The female threaded element 91 is secured to the transfer tube 30, and the male threaded element 93 is configured so that a top end 95 of the male threaded element 93 bears on an external surface of the at least one anti-rotation member 70. For example, the female threaded element 91 may be provided in the body of the transfer tube 30. The anti-rotation member 70 may then be fastened to the transfer tube 30 by clamping between the transfer tube 30 and the top end 95 of the male threaded element 93 when the male threaded element 93 is screwed relative to the female threaded element 91. According to one embodiment, the fastening system 90 comprises a plurality of studs or screws distributed or not over the length of the transfer tube 30, so as to maintain the at least one anti-rotation member 70 in a fastened manner on the transfer tube 30.

Figure 3:
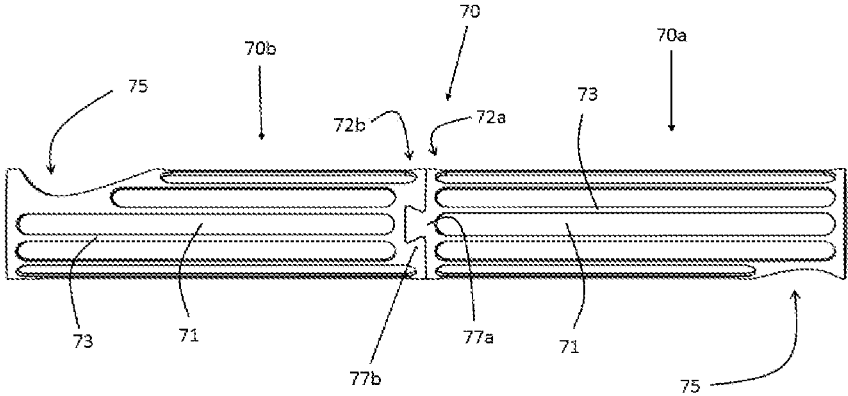
FIG. 3 is a schematic perspective view of the anti-rotation member according to a particular embodiment of the disclosure.

According to a non-limiting embodiment represented in particular on FIG. 3, the at least one anti-rotation member 70 may comprise at least one first anti-rotation member 70*a* and one second anti-rotation member 70*b* ranging in the transfer tube 30 along the transfer axis. It is therefore well understood that the transfer device 1 may comprise a plurality of anti-rotation members 70. In this case, each anti-rotation member 70 may be disposed axially in the extension of another adjacent anti-rotation member 70. In other words, the transfer device 1 may comprise a plurality of anti-rotation members 70 mounted in the extension of each other along the transfer axis. For example, the second anti-rotation member 70*b* extends axially the first anti-rotation member 70*a* from an axial end 72*a* of the first anti-rotation member 70*a*.

According to this embodiment, the first anti-rotation member 70*a* may be provided, at said axial end 72*a* of the first anti-rotation member 70*a*, with a first blocking element 77*a*. The second anti-rotation member 70*b* may also be provided, at an axial end 72*b* of the second anti-rotation member 70*b*, with a second blocking element 77*b*. In this case, said first and second blocking elements 77*a*, 77*b* may be configured to cooperate with each other, so as to block a relative rotational movement between the first anti-rotation member 70*a* and the second anti-rotation member 70*b* about the rotational axis of the endless screw 50. According to a first variant not represented, the first blocking element 77*a* and the second blocking element 77*b* are configured to cooperate with each other by snap-fitting. According to a second variant represented on FIG. 3, the first blocking element 77*a* comprises a female part and the second blocking element 77*b* comprises a male part, the female part being configured to cooperate with the male part. Advantageously, said first and second blocking elements 77*a*, 77*b* form an assembly configured to block, in addition, a relative movement of axial translation along the transfer axis between the first anti-rotation member 70*a* and the second member anti-rotation 70*b*. For example, said first and second blocking elements 77*a*, 77*b* form a dovetail assembly. Thus, and advantageously, the dovetail assembly and the fastening system 90 make it possible to fasten the assembly constituted by the first and second anti-rotation members 70*a*, 70*b* to the transfer tube 30. Thus, the fastening system 90 ensures the removable fastening of the first anti-rotation member 70*a* to the transfer tube 30 without providing a direct connection between the transfer tube 30 and the second anti-rotation member 70*b*, and the second anti-rotation member 70*b* is itself even maintained in axial translation and in rotation about the rotational axis by the first anti-rotation member 70*a* (itself secured to the transfer tube 30 by the fastening system 90 through the first and second blocking elements 77*a*, 77*b* cooperating with each other).

All of the arrangements previously described make it possible to propose a transfer device 1 capable of transferring a solid material between an inlet 32 and an outlet 33 of the transfer tube 30 in particular thanks to the presence of the anti-rotation member 70. Advantageously, proposing a removable anti-rotation member 70 makes it possible to facilitate the maintenance and the cleaning of the transfer device 1. This is particularly advantageous when the solid material to be transferred is a putrescible or sterile material, for example a solid material used in the pharmaceutical, cosmetic, agri-food industry, in biotechnology or in a related field.

The invention claimed is:

1. A transfer device suitable for transferring a solid material in powder, particulate or granular form, the transfer device comprising:

a transfer tube extending along a transfer axis and comprising two opposite ends respectively delimiting an inlet allowing the solid material to enter the transfer tube and an outlet allowing the solid material to exit from the transfer tube, the transfer tube being an integral piece;

at least one endless screw with at least one thread disposed inside the transfer tube, rotatably mounted with respect to the transfer tube along a rotational axis coinciding with, or parallel to, the transfer axis and configured to ensure, when said at least one endless screw is driven in a rotational movement about the rotational axis, a displacement of the solid material relative to the transfer tube oriented from the inlet to the outlet of the transfer tube;

at least one motion actuator ensuring a rotational movement of said at least one endless screw relative to the transfer tube;

at least one anti-rotation member removably positioned in the transfer tube at an intermediate location radially positioned between an internal face of the transfer tube and the top of said thread of said at least at least one endless screw, said at least one anti-rotation member comprising an internal surface facing said at least one endless screw, the internal surface being provided with blocking asperities configured to oppose a rotational movement of the solid material relative to the transfer tube about the rotational axis and thereby convert, for the solid material present in the transfer tube, the rotational movement of the endless screw into said displacement of the solid material from the inlet to the outlet of the transfer tube wherein said displacement comprises an axial component along the transfer axis;

a fastening system configured to fasten the at least one anti-rotation member to the transfer tube in a reversible manner.

2. The transfer device according to any of claim 1, wherein the at least one anti-rotation member is provided in the form of all or part of a cylindrical surface.

3. The transfer device according to claim 2, wherein the generatrix of the at least one anti-rotation member is oriented so as to coincide with, or be parallel to, the transfer axis of the transfer tube.

4. The transfer device according to claim 2, wherein the anti-rotation member presents a tubular shape.

5. The transfer device according to claim 1, wherein the blocking asperities comprise at least one recessed groove in the internal surface in the at least one anti-rotation member.

6. The transfer device according to claim 1, wherein the blocking asperities comprise at least one rib protruding from the internal surface of the at least one anti-rotation member.

7. The transfer device according to claim 1, wherein the blocking asperities are arranged only axially on the internal surface of the at least one anti-rotation member along the transfer axis.

8. The transfer device according to claim 1, wherein the blocking asperities are angularly distributed over the internal surface of the at least one anti-rotation member about the transfer axis.

9. The transfer device according to claim 1, wherein the transfer tube comprises a lateral wall and an intake opening provided through said lateral wall, the intake opening being disposed at the inlet and configured to allow the solid material to be introduced into the transfer tube from the outside of the transfer tube, and wherein the transfer tube comprises a discharge opening provided through the lateral wall and disposed at the outlet, said discharge opening being configured to allow the solid material having been transferred along the transfer tube to pass from the inside to the outside of the transfer tube.

10. The transfer device according to claim 9, wherein the at least one anti-rotation member comprises a passage opening disposed in line with the intake opening of the transfer tube and/or a passage opening disposed in line with the discharge opening of the transfer tube, each passage opening being configured to allow the passage of the material solid alternately between the outside and the inside of the anti-rotation member.

11. The transfer device according to any claim 1, wherein the at least one anti-rotation member comprises at least one first anti-rotation member and one second anti-rotation member ranging in the transfer tube along the transfer axis.

12. The transfer device according to claim 11, wherein the first anti-rotation member is provided, at an axial end of the first anti-rotation member, with a first blocking element, and wherein the second anti-rotation member is provided, at an axial end of the second anti-rotation member, with a second blocking element, said first and second blocking elements being configured to cooperate with each other, so as to block a relative rotational movement between the first anti-rotation member and the second anti-rotation member about the rotational axis of the endless screw.

13. The transfer device according to claim 12, wherein said first and second blocking elements form an assembly configured to further block a relative movement of axial translation along the transfer axis between the first anti-rotation member and the second anti-rotation member.

14. The transfer device according to claim 13, wherein said first and second blocking elements form a dovetail assembly.

* * * * *